United States Patent [19]

Pietschmann

[11] 4,259,066
[45] Mar. 31, 1981

[54] RETRACTION MECHANISM FOR DENTAL UNITS AND THE LIKE

[75] Inventor: Helmut Pietschmann, Karlsbad, Fed. Rep. of Germany

[73] Assignee: Sybron Corporation, Rochester, N.Y.

[21] Appl. No.: 29,731

[22] Filed: Apr. 13, 1979

[30] Foreign Application Priority Data

May 30, 1978 [DE] Fed. Rep. of Germany ....... 2823513

[51] Int. Cl.³ .............................................. A61G 1/14
[52] U.S. Cl. ................................. 433/78; 137/355.23; 242/47.5; 242/182
[58] Field of Search ..................... 433/78; 137/355.16, 137/355.23; 242/47.5, 182

[56] References Cited

U.S. PATENT DOCUMENTS

| 2,261,325 | 11/1941 | Angell | 433/78 |
|---|---|---|---|
| 2,545,063 | 3/1951 | Wolfe | 242/47.5 |
| 3,391,875 | 7/1968 | Hamrick | 137/355.23 |
| 3,427,719 | 2/1969 | Gordon et al. | 433/78 |
| 3,550,828 | 12/1970 | Watson | 242/182 |
| 3,722,095 | 3/1973 | Pietschmann | 433/78 |
| 4,052,022 | 10/1977 | Reijnhard | 242/182 |

*Primary Examiner*—Gene Mancene
*Assistant Examiner*—John J. Wilson
*Attorney, Agent, or Firm*—Theodore B. Roessel; Roger Aceto

[57] ABSTRACT

A pneumatic mechanism for dental units wherein a differential pressure applied directly to the utility supply line acts to move the line to a stored position within the unit.

9 Claims, 6 Drawing Figures

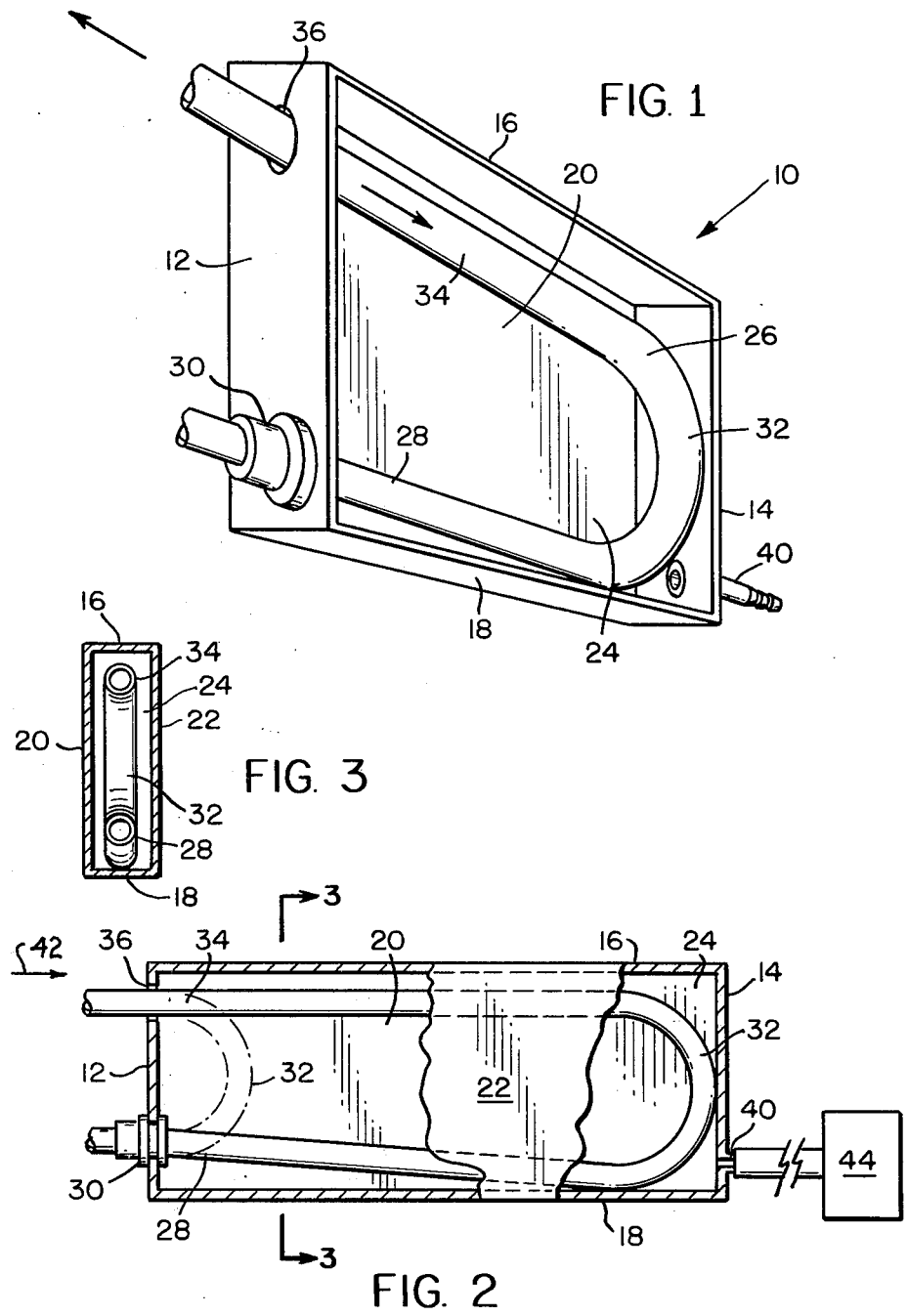

RETRACTION MECHANISM FOR DENTAL UNITS AND THE LIKE

BACKGROUND OF THE INVENTION

The present invention relates generally to retraction mechanisms for utility supply lines and more particularly to a dental unit or the like wherein fluid pressure is utilized to retract a utility supply line connected to a dental instrument.

It is well known in dental units to have a dental instrument nested in the unit and connected by a cord, hose, etc. to a utility supply. It is desirable in such units to provide a mechanism for retracting or pulling the extended utility supply line back into the dental unit, when the dental instrument is being returned to a storage position. This not only provides a neat appearance to the dental office, but also free-hanging cords or other utility supply lines may be disturbing to the patient.

Various retraction mechanisms are known which allow for the extension of the utility line out of the unit when the instrument is being moved to an in-use position and which serve the purpose of automatically retracting the utility supply line back into the dental unit when the instrument is returned to a storage or out-of-use position.

For example, such retraction mechanisms may operate by gravity. Here the utility line may pass over a system of pulleys and counter weights which move under the influence of gravity to provide the retraction force. Other systems may utilize a spring force for retracting the utility lines. All these systems, however, have the inherent disadvantage that the operator must pull on the dental instrument with force in order to overcome the retraction force. Such systems also require that the retraction mechanism be locked in order to eliminate a constant strain on the utility line, when the dental instrument is in a position of use.

Other retraction systems may utilize motors for driving a re-wind reel or other retraction mechanism but these have the disadvantage of having a relatively high initial cost.

Still other retraction systems are known which utilize a fluidic pressure to provide the retraction force. Such systems are shown for example in U.S. Pat. Nos. 3,722,095, 3,427,719, and 3,391,875. However, the fluid operated systems shown in all of these patents depend upon the action of a piston for transmitting the applied fluid pressure into motion for retracting the hose. Further, the systems disclosed in these patents have the utility supply line looped about pulleys which increase the length of the loop for retracting the supply line, but make no provisions for changing the shape of the loop. Pulley guided systems also have the disadvantage that care must be taken to prevent the utility line from slipping off of the pulley during operation.

The present invention provides a fluid operated retraction system which eliminates all of the drawbacks of the prior art, in that the fluid pressure for imparting motion to the utility supply line, operates directly on the utility line. This eliminates the need for any pulley or piston system, and also greatly reduces the space and cost requirements, as well as the number of components involved in making the system operative.

SUMMARY OF THE INVENTION

The retraction mechanism of the present invention may be characterized in one aspect thereof by a housing into which the utility supply line is retracted. The portion of the utility supply line within the housing forms a generally U-shaped loop which changes its shape and size responsive to the direct application of fluid pressure on the supply line. In one embodiment of the invention the entire housing may be evacuated so that ambient pressure, acting directly on that portion of the utility supply line outside of the housing, pushes the supply line into the housing. In another embodiment, the side walls of the housing are close together so the width of the housing is the same as the diameter of the supply line. In this embodiment the utility supply line and housing side walls form a generally fluid-tight engagement. With this arrangement a differential pressure may be created across the portion of the utility supply line within the housing for moving the supply line.

DESCRIPTION OF THE DRAWINGS

FIG. 1 is a perspective view showing one embodiment of the present invention;

FIG. 2 is a side elevation view of the FIG. 1 embodiment partly broken away and in section;

FIG. 3 is a view taken along lines 3—3 of FIG. 2;

DESCRIPTION OF THE PREFERRED EMBODIMENTS

Figures 4, 5, 6:
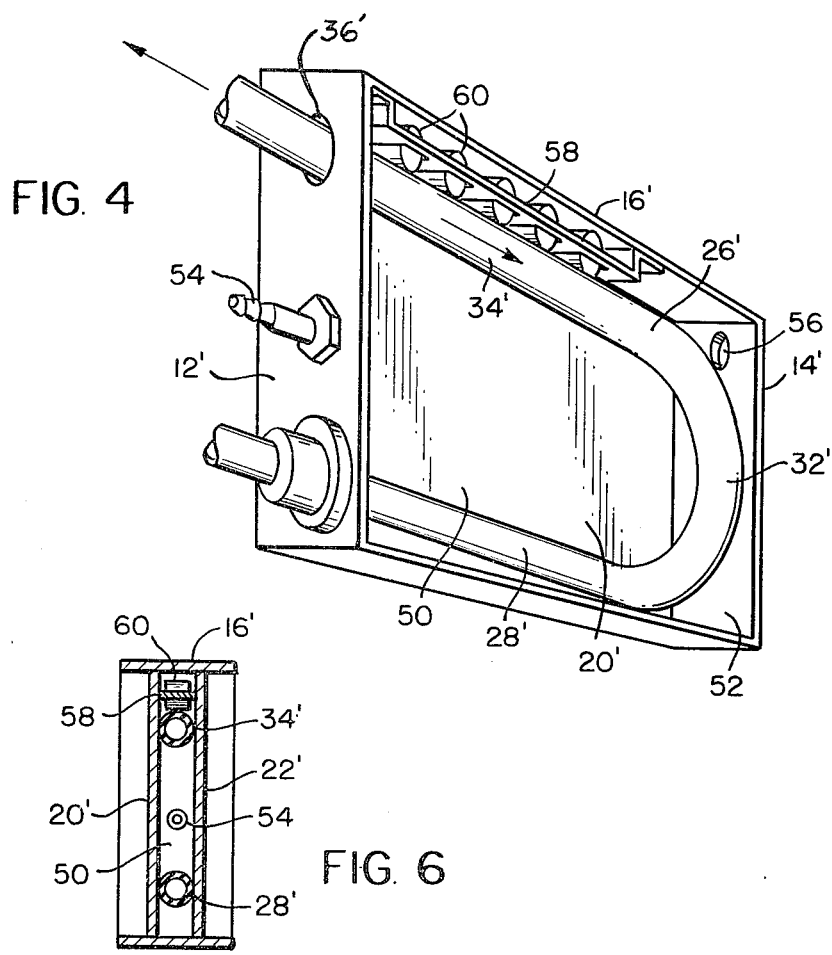
FIG. 4 is a perspective view showing another embodiment of the retraction mechanism of the present invention.
FIG. 5 is a side elevation view, partly in section and broken away, of the FIG. 4 embodiment.
FIG. 6 is a view taken along lines 6—6 of FIG. 5.

Referring to the drawings, FIG. 1 shows the retraction system of the present invention generally indicated at 10. The system includes a housing formed by front and rear end walls 12, 14 respectively, a top 16, a bottom 18 and elongated side walls 20 and 22 (side wall 22 being removed for purposes of clarity). The housing constructed in this manner encloses an elongated chamber 24 for receiving and storing a utility supply line 26, as set out hereinbelow.

The utility supply line may be any electric cord, water hose, or air or vacuum line, which connects a utility source (air, water, vacuum or electricity), to an instrument requiring a utility supply as for example a dental instrument such as a hand piece, syringe, evacuator or the like. As shown in the drawings, utility supply line 26 has a portion of its length stored within housing 10, in a single, free standing generally U-shaped loop. In this respect the utility line has its inlet leg 28 extending through the front end wall 12 of the housing for connection to a utility source (not shown). The passage of the inlet leg through the front end wall is sealed by a suitable pressure tight connector 30, such as a grommet or the like. Connector 30, in effect, fixes one end of the U-shaped loop to the front end wall.

While FIG. 1 shows the utility supply line as passing through connector 30, it should be appreciated that connector 30 could itself be a suitable electric outlet or other utility connection, to which one end of inlet leg 28 is attached for receiving the utility from the utility source located outside the housing.

In any event, inlet leg 28 of the utility supply line extends along housing bottom 18 towards rear end wall 14. The supply line makes single loop 32 and has its outlet leg 34 extending out of the housing through an opening 36 in the front end wall. Outlet leg 34 then connects to an instrument (not shown).

Preferably, the I.D. of opening 36 is only slightly larger than the O.D. of the utility supply line. If need be, a suitable flexible seal (not shown) may be provided to form a sliding, relatively fluid tight seal, between the utility supply line and opening 36.

Completing the structure of the retraction means, is a vent connection 40 located in the rear end wall 14 which is connected to any suitable evacuation means 44 for reducing the pressure in chamber 24.

Referring to FIG. 2, the solid line shows the utility line 26 in a stored position, wherein the return bend or loop 32 extends substantially all the way to rear end wall 14. When the instrument attached to the utility supply line is pulled to an in-use position, a length of the supply line is pulled from the housing through opening 36. This moves loop 32 towards front wall 12 to the position shown in phantom line in FIG. 2.

After the instrument is used, it is returned to the stored or out-of-use position. This requires that the portion of the utility supply line previously pulled out of the housing be moved back into the housing. This is accomplished by activating any suitable evacuation means 44 connected to outlet 40 to lower the pressure of chamber 24 within the housing, as compared to ambient pressure outside of the housing. This differential pressure results in a force being exerted directly on the portion of outlet leg 34 outside of the housing. This force working against the crossectional area of the utility supply line in the direction of arrow 42, acts to push the outlet leg 34 back into the housing, until either loop 32 reaches the rear end wall 14, or the evacuation of chamber 24 is stopped.

Thus in the embodiment as described, the differential pressure acting directly on the utility supply line, is sufficient to move the line back into the housing and no other retraction means such as springs, mechanical devices, or pistons are required. When the desired length of the utility supply line is retracted into the chamber, the evacuation process can be stopped and the chamber vented to return the chamber to ambient pressure. When it is again required to extend the line out of the chamber, there is no retraction force present. Accordingly, locking means for holding the utility supply line at any desired extended position is not required, due to the absence of such retraction force during the extension of the line.

Referring now to FIGS. 4-6, an embodiment is shown which is similar to the embodiment of FIGS. 1-3, except that a differential pressure is created within the housing and across the utility line. For this purpose, the housing has its side walls 20' and 22' spaced apart by a distance substantially equal to the diameter of the utility line 26' (FIG. 6). With this arrangement, chamber 24' within the housing, is divided into two portions. A first portion 50 of the chamber is bounded by and located within the generally U-shape of utility line 26' and the front end wall 12' of the housing. The second chamber portion 52 is that volume of chamber 24' located generally between rear end wall 14' and utility line 26'.

Front end wall 12' has a connection 54 for attachment to any suitable source of pressurized fluid. By means of this connection 54, fluid under pressure may be supplied to the first chamber portion 50. The rear end wall 14' has an opening 56 for purposes of venting the second chamber portion 52.

Completing the structure of this embodiment, is a bracket 58 attached to the inside surface of the housing top 16'. This bracket carries a plurality of roller bearings 60 for purposes set out hereinbelow.

According to the embodiment shown in FIGS. 4-6, the portion of utility line 26' within chamber 24' including inlet leg 28', return bend or loop 32' and outlet leg 34' divides chamber 24' into two portions. First portion 50 is within the loop of the U-shape and second portion 52 is outside the loop of the U-shape. Now, when fluid under pressure is admitted to first chamber portion 50, through connection 54, the increase in pressure in chamber portion 50, will retract the utility supply line into the housing, by moving the loop to the right as shown in phantom line in FIG. 5. As the utility line moves to the right, as shown in FIG. 5 air displaced from chamber portion 52 by the moving line is simply vented through opening 56.

Also, when the pressure within chamber portion 50 is increased, utility line outlet leg 34' will be forced upwards against rollers 60. These rollers, then, facilitate retraction by allowing the utility line to roll across these roller bearings 60 as the line is being retracted into the chamber.

Thus with the retraction mechanism as shown in FIGS. 4-6 a differential pressure is created across the portion of the utility supply line in chamber 24'. This differential pressure is applied directly to the supply line and acts as the retraction force for moving the supply line into the housing. When the desired length of line is retracted into chamber 24, the supply of pressurized fluid to connection 54 can be stopped and the pressure balanced.

It should be appreciated that the venting of chamber portion 52 can be accomplished as shown, or by simply eliminating rear wall 14'.

In summary then, the retraction mechanism of the present invention provides for the direct application to the utility supply line of a pressure differential, for purposes of retracting the supply line into the housing without the need of any piston, pulley, spring or other mechanical, electrical, or pneumatic device. In one embodiment of the invention, this differential pressure is created by evacuating the housing, so that ambient pressure acting on the portion of the utility line outside the housing, pushes the utility line into the housing. In another embodiment of the invention a portion of the utility supply line defines a generally fluid tight chamber in the housing so that a differential pressure across the supply line within the housing creates the retraction force directly on the supply line.

We claim:

1. A retraction mechanism for a utility supply line of dental units of the type having at least one instrument connected to a utility supply line so the instrument can be moved between a storage position on the unit to an in-use position spaced from the unit, the retraction mechanism providing for retraction of the utility line back into the unit as the instrument is moved from the in-use position to a storage position comprising:

(a) a housing having spaced side walls defining sides of a utility line storage chamber;
   (b) said utility line having a portion of its length forming a generally U-shaped loop extending into said chamber, one leg of said U-shaped loop being fixed with respect to said housing and the other leg being movable into and out of said chamber;

(c) said U-shaped loop dividing said storage chamber into two portions, a first portion being defined by the volume lying within the legs of said U-shape and a second portion being defined by the volume of said storage chamber located about said U-shaped loop;

(d) said utility line having an O.D. substantially the same as the width between said spaced side walls whereby said utility line forms a sliding, generally fluid tight seal between said first and second chamber portions; and (e) means for creating a differential pressure between said first and second chamber portions and across said generally U-shaped loop for moving said utility supply line into said housing.

2. A retraction mechanism as in claim 1 including said housing having a front end wall with an opening therethrough to permit the passage of the movable leg of said U-shaped loop of utility line wherein:

(a) said first chamber portion is located between said housing front end wall and said loop; and (b) said means for creating a differential pressure includes means for introducing a fluid under pressure through said front end wall and into said first chamber portion.

3. A retraction mechanism as in claim 1 including roller members extending between said side walls, one leg of said generally U-shaped loop being pressed against said roller members responsive to said differential pressure.

4. A retraction mechanism as in claim 1 wherein said means for creating a differential pressure across said U-shaped loop includes means for evacuating said second chamber portion.

5. A retraction mechanism for dental units comprising:

(a) a housing having a front end wall with an opening therethrough and spaced side walls;

(b) a utility line extending into said housing and being fixed to a point along its length to said housing adjacent said front end wall, one end of said utility line extending slidably through said opening, the portion of said utility line between its fixed point and said opening forming a generally U-shaped loop which elongates and shortens as said utility line moves respectfully into and out of said housing;

(c) the O.D. of said utility line being substantially the same as the width of said chamber between said spaced walls;

(d) said front end wall and said generally U-shaped loop of utility line defining a substantially fluid tight chamber therebetween; and (e) means for introducing fluid under pressure into said chamber to create a differential pressure across said loop of utility line for moving said utility line into said housing to elongate said loop.

6. A retraction mechanism for the utility lines of a dental unit comprising:

(a) a housing having an end wall and spaced side walls defining a storage chamber;

(b) a utility line extending into said chamber through the front of said housing, said utility line forming a generally U-shaped loop in said chamber with one leg of said U-shaped loop being fixed adjacent the front of said housing and the second leg of said loop extending through the front of said housing;

(c) said utility line having an O.D. substantially the same as the width of said chamber between said spaced side walls whereby said U-shaped loop forms a sliding, generally fluid tight seal against said side walls; and (d) means for creating a differential pressure uniformly across said U-shaped loop within said housing, said loop becoming elongated responsive to the direct uniform application thereto of said differential pressure to retract a portion of said utility line into said housing.

7. A retraction mechanism as in claim 6 wherein:

(a) said end wall is a front end wall provided with an opening through which the second leg of said U-shaped loop extends, the I.D. of said opening being substantially the same as the O.D. of said utility line; and (b) said means for creating a differential pressure includes means for introducing fluid under pressure through said front end wall between the legs of said U-shaped loop.

8. A retraction mechanism as in claim 6 in which said end wall is a rear end wall and said means for creating a differential pressure includes means for evacuating the portion of said chamber between said U-shaped loop and said rear end wall.

9. A method for retracting utility lines and the like in dental units comprising the steps of:

(a) providing a housing having an end wall, spaced side walls and a utility line which extends into said housing through the front thereof;

(b) forming said utility line into a generally U-shaped loop within said housing by fixing the end of one leg of said U-shaped loop adjacent the front of said housing and extending the other leg of said loop through the front of said housing;

(c) spacing said side walls apart by a distance substantially equal to the O.D. of said utility line so that said U-shaped loop, said end wall and said side walls define a fluid tight chamber in said housing;

(d) creating a pressure differential within said housing and across said U-shaped loop; and (e) moving said loop solely responsive to the direct application thereto of said differential pressure for elongating said U-shaped loop and retracting a portion of said utility line into said housing.

* * * * *